No. 699,595. Patented May 6, 1902.
A. WAGNER.
STORAGE BOX FOR PHOTOGRAPHIC PLATES.
(Application filed Jan. 11, 1902.)
(No Model.)
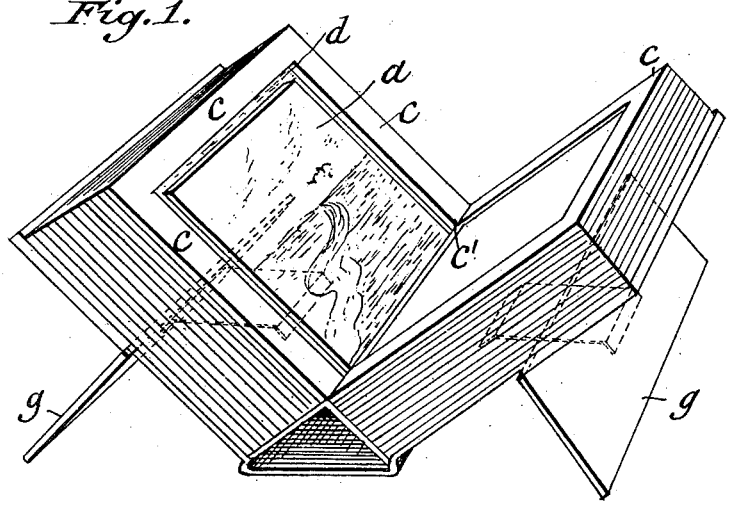
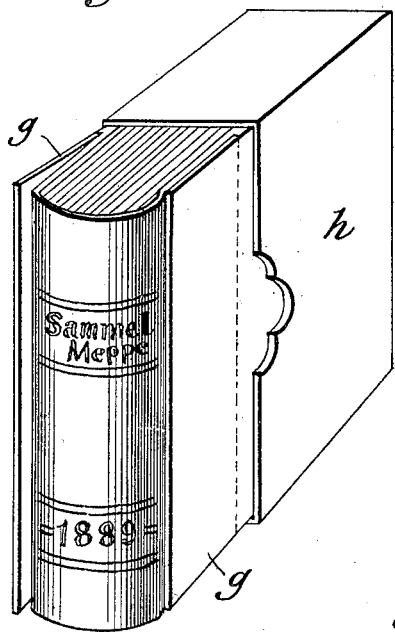
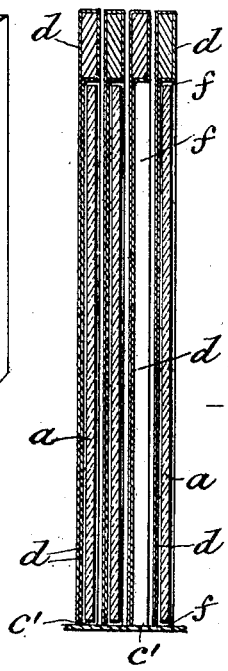
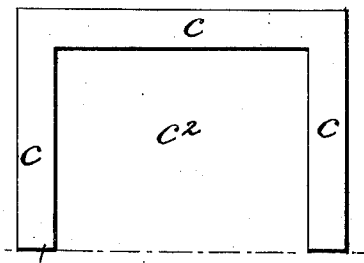
Witnesses
H. H. Schott
E. J. Peterson
Inventor
Alfred Wagner
By Max Georgii
his Attorney

UNITED STATES PATENT OFFICE.

ALFRED WAGNER, OF MUNICH, GERMANY.

STORAGE-BOX FOR PHOTOGRAPHIC PLATES.

SPECIFICATION forming part of Letters Patent No. 699,595, dated May 6, 1902.

Application filed January 11, 1902. Serial No. 89,364. (No model.)

*To all whom it may concern:*

Be it known that I, ALFRED WAGNER, a citizen of Bavaria, residing at Ohmstrasse 6, Munich, Germany, have invented certain new and useful Improvements in Storage-Boxes for Photographic Plates; and I do hereby declare the following to be a full, clear, and exact description of the invention, such as will enable others skilled in the art to which it appertains to make and use the same.

The present invention relates to receivers or receptacles for the storage and ready inspection of a number of photographic negatives and their plates, the object of the said invention being to provide a receiver in which the plates can be stored with a minimum of space and wherein the said plates or negatives may be readily inspected without displacement or removal of the same.

With these objects in view the storage-receptacle for photographic plates consists, essentially, of a number of frames arranged in book form and having a recess or opening corresponding to the size and shape of the plates in which the plates rest, said recesses extending to the hinge portion—that is, at the point where they are joined to the back of the book. My invention also involves the arrangement in connection with said frames of a supporting sheet or sheets, upon which the plates are arranged to lie.

My invention, moreover, consists in such further features and combinations of parts, as will be hereinafter set forth, and pointed out in the claims.

I will now describe the said invention in detail, with reference to the accompanying drawings, in which—

Figure 1 represents in perspective a plate-receptacle embodying my invention in its preferred form, the said plate-holder being represented as spread open for the purpose of inspection of the plate. Fig. 2 represents a similar view of the said plate-receptacle closed and partially inserted into a case; Fig. 3, a transverse section, on an enlarged scale, of a number of plate-holding leaves of which the receptacle is formed; and Fig. 4, a detail view of one of the frames forming part of such leaves.

The plate-holding receptacle thus illustrated is distinguished particularly from other devices of this character hitherto known by the construction of the leaves which make up the plate-receptacle, each of these leaves being designed for the reception of one plate. Each of these plates consists of a rectangular frame $c$, closed at three sides and open at the bottom or hinge portion $c'$, said frame being made of pasteboard or any other suitable or convenient material, the thickness being about equal to the thickness of a photographic plate or slightly in excess of such thickness. The fact that the frame $c$ is open at the bottom or hinge portion results in the substantial advantage of a new plate-receptacle, for the reason that the absence of the lower side of the rectangular or other shaped frame at the hinge portion permits the photographic plate arranged within the same to rest directly on the back of the book to be turned directly with the hinge portion of the leaf, whereby the various leaves of the plate-receptacle may be turned over readily without danger of displacement of the plate. This would not be the case if the frame $c$ were closed at the bottom, in which case the turning over of the leaf would easily result in the slipping out of the plate, a displacement of the same out of the holding-frame, and an interposition of the same between two consecutive leaves, which would prevent the subsequent closing of the receptacle. Under such conditions a convenient turning of the leaves would be out of the question, because the plates would always have to be returned to their original position before passing from one leaf to the other. In order to hold the plates in place in the frame $c$, the latter has pasted over the opening $c^2$ a thin sheet $d$, of paper textile or the like. Preferably, as shown in the present case, the sheet $d$ of such thin material is pasted both on the front and the back, the same being tightly stretched on the back, while the sheet pasted on the front is pressed into the recess $c^2$ of the frame and until it rests on the tightly-stretched sheet at the back, to which it may be secured by paste or in any other desired manner. In this manner, as shown in Fig. 3, recesses $f$ are formed in the leaves of the receptacle, the thin rear wall of which serves to separate the frame resting in said recess from the plate resting in the adjoining leaf. The leaves so formed are bound together to form a book or album in a manner well understood. The covers of such book or album may be made in any desired or ordinary manner, but are preferably made as shown in Figs. 1 and 2—that is to say, with hinge-sections *g*, which when the book is spread open, as shown in Fig. 1, are turned outward, as shown in Fig. 1, so as to form props, whereby the inspection of the album or receptacle is greatly facilitated. These hinge-props *g* are preferably retained in their outermost position by ties or bands or similar holding device, as indicated in dotted lines in Fig. 1. When the plates are placed in position or when the inspection of the same has been finished, the book is closed and the hinge-props *g* are laid against the covers of the same. All the plates are thereby securely closed and held in place. The book may then be inserted in a light-proof case *h* of any desired description, whereby the plates will be protected against the influence of light. The book-shaped receptacle so formed may then be put on shelves or into book-cases, and the backs of the same may be provided with labels indicating the contents—for example, whether the same are landscapes, portraits, developed or undeveloped, the time of exposure, of development, &c., the number of plates, &c.

It will be understood that the plates are not fastened to or in the leaves, but lie within the recess and rest upon the rear wall.

What I claim as new, and desire to secure by Letters Patent of the United States, is—

1. In a receptacle for photographic plates and the like, a leaf having a recess in its face to receive the plates, said recess extending to the lower edge of the leaf and exposing the entire surface of the plate.

2. In a receptacle for photographic plates and the like, a book consisting of a number of leaves hinged together each of which has a recess in its face extending to its lower edge and exposing the entire surface of the plate.

3. In a receptacle for photographic plates, a leaf consisting of a substantially U-shaped frame, and a thin backing secured upon both sides of the frame and extending into the open portion of the same to form a plate-supporting recess extending to the lower edge of the leaf and exposing the entire surface of the plate.

4. In a receptacle for photographic plates, a number of leaves hinged together in a book form, said leaves consisting of frames open at the hinge and a thin backing secured upon and over the frame forming therewith a recess for the plates.

5. In a receptacle for photographic plates and the like, a leaf consisting of a frame open at one side and having thin covering-sheets attached to the front and back thereof, one of said sheets being stretched tight, while the other is depressed through the frame to form a recess, the two sheets being pasted or fastened together.

6. A book for holding photographic plates composed of a number of leaves hinged together, each of said leaves being composed of a frame open at the hinged side, and a thin sheet secured on the frame, stretched over the back thereof and drawn over the front of the same and pressed therethrough and onto the stretched sheet, whereby a recess with an open lower end is formed in the face of the leaf to support the plate with its lower edge resting on the back of the book.

In testimony whereof I affix my signature in presence of two witnesses.

ALFRED WAGNER.

Witnesses:
H. R. McGINNIS,
ANNIE WIMBAUER.